Sept. 29, 1936.  C. G. WILLETT ET AL  2,055,886
ROAD SCRAPER
Filed March 18, 1935  2 Sheets-Sheet 1

Inventors
Charles G. Willett
George W. Betteridge
By Lawrence &
Van Antwerp
Attorneys Sept. 29, 1936.  C. G. WILLETT ET AL  2,055,886
ROAD SCRAPER
Filed March 18, 1935  2 Sheets-Sheet 2
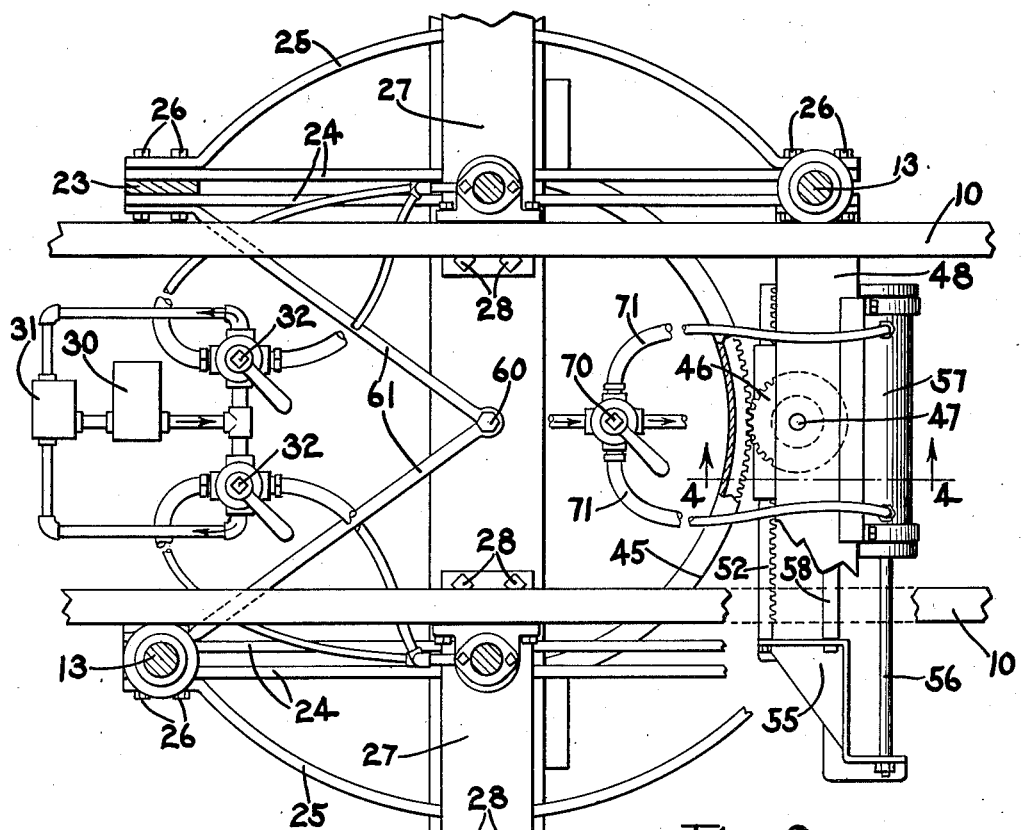
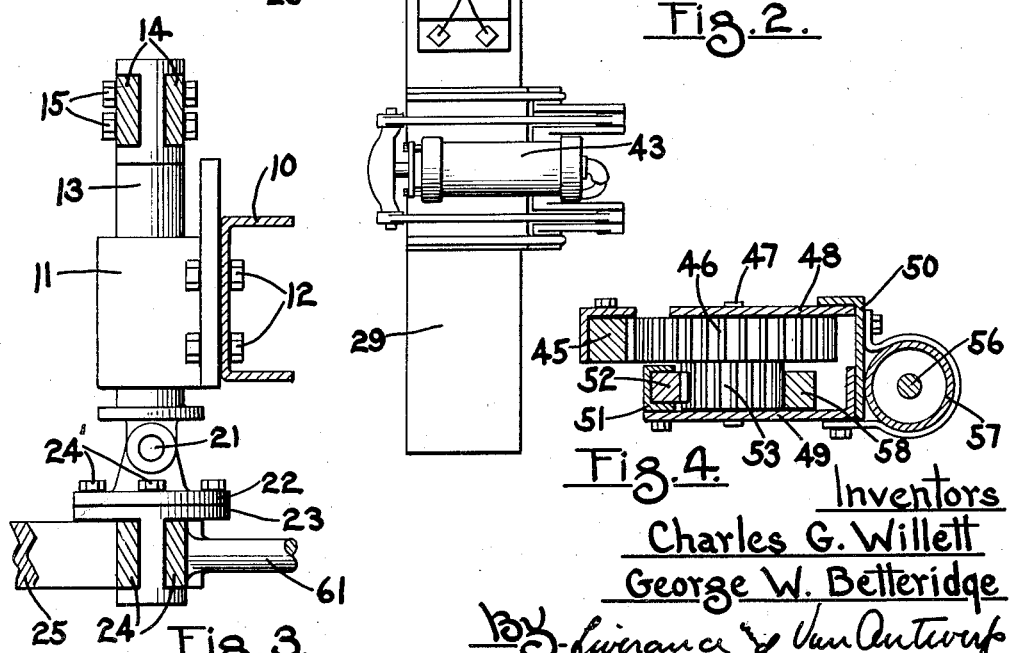
Inventors
Charles G. Willett
George W. Betteridge
Attorneys Patented Sept. 29, 1936

2,055,886

UNITED STATES PATENT OFFICE 2,055,886

ROAD SCRAPER

Charles G. Willett and George W. Betteridge, Grand Rapids, Mich.; said Betteridge assignor to said Willett Application March 18, 1935, Serial No. 11,531

5 Claims. (Cl. 37—155)

This invention relates generally to a scraping mechanism and more particularly to a road scraper wherein the scraping blade may be raised or lowered at either end thereof.

Briefly described, our invention consists of a truck chassis having vertically movable frames at each side thereof, these frames including cross members upon which the beam, carrying the scraper blade thereon, is mounted for movement about a vertical pivot.

One of the main objects of our invention is the provision of mechanism whereby the scraper blade may be raised or lowered at either end as desired. This adjustment positions the scraper blade at an angle to the road upon which the wheels of the truck roll and is desirable on many occasions. In this regard it is to be noted that these pivotal connections, which permit raising and lowering of the ends of the blades, extend longitudinally of the truck and consequently the pull of the truck frame, which in turn pulls the scraper blade, is readily transmitted through the several parts. Furthermore, the vertically movable frames are prevented from longitudinal spreading by the lower member of the frame in spite of its pivotal connection thereto.

Another advantage of our invention resides in the positioning of the means for rotating the beam and its scraping blade upon the vertically movable frames whereby a positive and direct action therebetween is obtained.

Other advantages reside in our particular construction which is relatively simple and consequently economical to build. Furthermore, the operative mechanism therefor is so positioned as to give easily and direct action without binding of the several parts.

Still other advantages, not mentioned, will become apparent to one skilled in this art, as the description is read.

In the drawings:—

Fig. 2 is a sectional plan view taken substantially on the plane of the line 2—2 of Fig. 1.

Fig. 3 is a sectional view taken along the line 3—3 of Fig. 1.

Fig. 4 is a sectional view taken along the plane of the line 4—4 of Fig. 2.

Like numerals refer to like parts throughout the several views.

Figure 1:
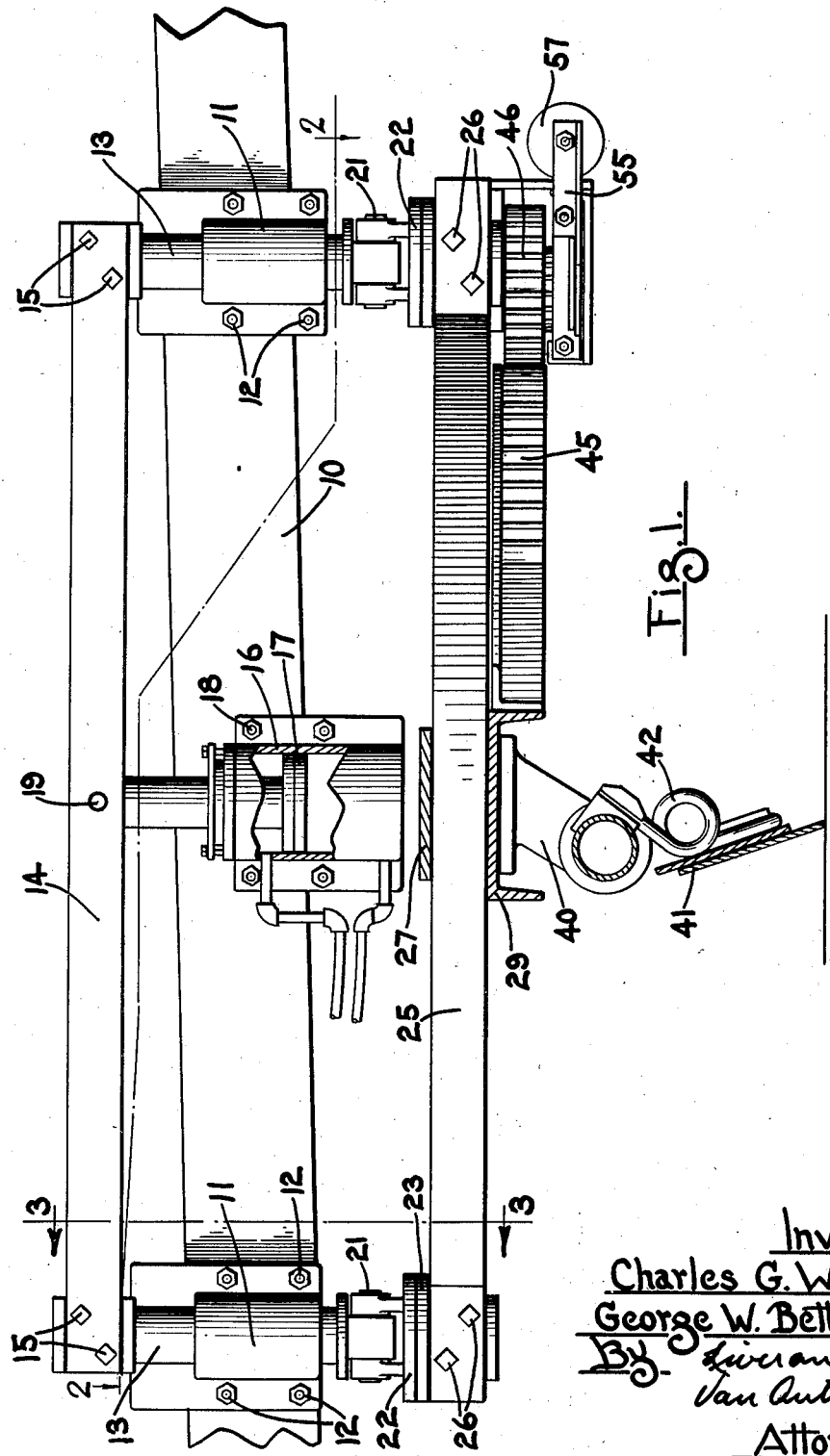
Fig. 1 is a side view of our invention applied to the chassis of a truck, parts being broken away in order to expedite the showing.

Numeral 10 indicates the side members of a truck chassis which has vertically located bearings 11 thereon. There are four of these bearings 11, two of them being fastened to each of the side members of the chassis. Bolts 12, see Fig. 3, hold these bearings 11 in position.

Cylindrical members or plungers 13 are slidable in the bearings 11. Top cross members 14, see Figs. 2 and 3, are bolted at 15 onto the plungers 13. A cylinder 16, having a double acting piston 17 therein, is bolted at 18 onto the chassis side member as shown in Fig. 1. The piston 17 is pivoted at 19 onto the top cross members 14. A similar cylinder and piston construction is mounted at the opposite side of the chassis frame.

As clearly shown in Fig. 2, a hydraulic system, having a pressure supplying means 30, a reservoir 31, four-way valves 32 and suitable connections between the several elements, furnish a pressure fluid whereby the pistons 17 may be operated either individually or simultaneously to move vertically in either the same or opposite directions. Thus, proper manipulation of the four-way valves 32 causes the desired vertical movement of the top cross members 14 and the associated plungers 13.

Each of the plungers 13 is pivoted at 21 to a bifurcated member 22 and a block 23 is fastened therebelow by means of the bolts 24'. Straight cross members 24 and a curved cross bar 25, see Fig. 2, are bolted, as well as the radius rod 61, at 26 to the blocks 23 and these members extend through the U-shaped brackets 27, attached at 28 to the beam 29. The radius rod 61, however, is pivoted at 60 onto the beam 29 whereby the beam may be rotated about the axis 60. The beam 29 has depending brackets 40 and a scraping blade mechanism 41 attached thereto through the medium of springs 42.

The beam 29 supports a hydraulic mechanism 43 whereby the blade mechanism 41 is operated as desired.

The beam 29 has an arcuate toothed member 45 extending horizontally therefrom, see Figs. 1, 2 and 4. A gear 46, pivoted at 47 between the plates 48 and 49, meshes with the toothed element 45. The plate 48 is suitably attached and carried by two of the oppositely disposed block members 23.

The lower plate 49 is supported by the plate 48 through the L-shaped member 50 and the bottom plate 49 carries a U-shaped member 51 which slidably receives a toothed rack 52. A smaller gear 53 is rigidly attached to the shaft 47 whereby it rotates with the gear 46.

The rack 52 is attached to a Z-shaped bracket member 55, see Fig. 2, and a piston rod 56, attached to a piston within the cylinder 57, provides means for the reciprocating of the rack bar 52. The Z-shaped bracket 55 also carries a guide bar 58 in opposed relationship to the rack bar 52 whereby the rack bar 52 and the gear 53 are completely in mesh with one another. A four-way valve construction 70, together with suitable connections 71, provides for the transmission of pressure means to the cylinder 57 whereby the piston rod 56 and its associated parts may be operated.

The operation

Movement of the truck chassis causes movement of the entire scraper assembly as is obvious. The beam 29, pivoted at 60 upon the radius rod 61, is adapted to be rotated about a vertical axis by operation of the cylinder 57 and its associated mechanism which operates through the rack bar 52 and the arcuate toothed segment 45. Thus the beam and its scraping mechanism is positioned about this vertical axis.

Operation of the four-way valves 32 causes the vertical movement of the side frames relative to the truck chassis and thus the entire scraping blade and its mechanism is angularly positioned crosswise of the road which is being scraped. Thus the scraping edge of the blade does not necessarily lie in parallelism with the plane of the surface upon which the four wheels of the truck are rolling but it may be angularly positioned as is oftentimes desirable.

The invention is defined in the appended claims and is to be considered comprehensive of all forms of structure coming within their scope.

We claim:

1. In combination, a vehicle having two spaced members extending longitudinally thereof, a frame construction at each side of the vehicle and located on the said spaced members, each of said frames being substantially identical and comprising a top member having depending members, a lower cross member having pivots at either end thereof connected onto the said members, said pivots extending longitudinally of the vehicle, bearings permanently secured to the spaced member of the vehicle and receiving the said members of the frame whereby the frame may be moved vertically, means for moving the frame vertically, a beam fastened to the two lower cross members and scraping means located on the beam.

2. A scraper structure comprising, a truck frame, a beam, a scraper blade mounted on said beam, beam supporting means located on each side of said truck frame including bearings having vertical axes, members slidable therein, and pivotal joints, one on each member, and means for adjusting said beam by raising one side and lowering the other side, or vice versa, a material distance.

3. A scraper structure comprising, a vehicle frame, a beam, a scraper blade mounted on said beam, beam supporting means located on each side of said vehicle frame, said beam supporting means including freely sliding vertical guiding means on the truck frame, and fluid pressure means for raising or lowering either of said beam supporting means, said fluid pressure means being longitudinally positioned relative to the guiding means.

4. A device of the class described comprising, vehicle frame members, beam supporting members mounted for vertical movement at each end located adjacent each of the vehicle frame members, a beam supported by said movable beam supporting members and hydraulic means for raising or lowering either of said beam supporting members, said hydraulic means being located between the ends of the beam supporting members.

5. A device of the class described comprising, truck frame members, bearings mounted on the said frame members, beam supporting members mounted in said bearings for vertical movement, a beam supported by said beam supporting members, means for independently raising and lowering said beam supporting members, an arcuate toothed member rigid with said beam, a plate fastened to and extending between the beam supporting members and means rigid with said plate cooperatively associated with said arcuate toothed member for turning the same, said beam supporting members including pivotal connections parallel to the truck frame members between the bearings and plate connection whereby binding between the arcuate toothed member and its turning means is prevented.

CHARLES G. WILLETT.
GEORGE W. BETTERIDGE.